United States Patent [19]
Lee

[11] Patent Number: 5,490,906
[45] Date of Patent: Feb. 13, 1996

[54] FLUID DISTILLATION APPARATUS

[76] Inventor: Naisin Lee, 2105 Louis Rd., Palo Alto, Calif. 94303

[21] Appl. No.: 881,407

[22] Filed: May 11, 1992

Related U.S. Application Data

[60] Continuation-in-part of Ser. No. 615,945, Nov. 20, 1990, abandoned, which is a division of Ser. No. 456,080, Dec. 22, 1989, Pat. No. 4,976,824, which is a continuation of Ser. No. 207,572, Jun. 16, 1988, abandoned.

[51] Int. Cl.$^6$ .................................. B01D 3/34; C02F 1/04
[52] U.S. Cl. .................... 202/172; 202/176; 202/180; 202/185.1; 202/186; 202/187; 202/203; 203/10; 203/25; 203/49; 203/DIG. 17
[58] Field of Search ...................... 202/234, 172, 202/176, 185.1, 185.5, 187, 186, 202, 233, 235, 188, 203; 203/49, 25, 71, 10, DIG. 17; 159/28.6, 16.1

[56] References Cited

U.S. PATENT DOCUMENTS

| | | | |
|---|---|---|---|
| 2,368,665 | 2/1945 | Kohman | 203/49 |
| 2,372,846 | 4/1945 | Nettel et al. | 203/49 |
| 3,212,999 | 10/1965 | Sommers | 202/172 |
| 3,214,348 | 10/1965 | Lichenstein | 203/49 |
| 3,350,279 | 10/1967 | Tolchin | 202/83 |
| 3,843,463 | 10/1974 | Brown | 203/49 |
| 4,089,750 | 5/1978 | Kirschman et al. | 203/10 |
| 4,140,586 | 2/1979 | Kwanoski et al. | 203/49 |
| 4,595,459 | 6/1986 | Kusakawa et al. | 203/49 |
| 4,743,343 | 5/1988 | Sakai | 203/49 |
| 4,976,824 | 12/1990 | Lee | 202/176 |
| 5,332,476 | 7/1994 | Lee | 203/10 |

FOREIGN PATENT DOCUMENTS

| | | | |
|---|---|---|---|
| 816867 | 8/1937 | France | 203/49 |
| 780272 | 7/1957 | United Kingdom | 203/49 |

*Primary Examiner*—Wilbur Bascomb, Jr.
*Attorney, Agent, or Firm*—Townsend and Townsend and Crew

[57] ABSTRACT

Several embodiments of a fluid distillation system wherein each embodiment uses a primary container or chamber for water or fluid to be distilled and a secondary water container or chamber. The two chambers are adjacent to each other, and the secondary chamber cooperates with the primary chamber to direct water vapor generated in the system to travel to a reservoir for collection. The primary chamber has a heater therewithin near the upper surface of the water carried thereby. The heater is provided for generating water vapor from aerated water, whereby the water vapor when heated will pass out of water at the upper surface of the water and into fluid passages for flow to the reservoir. The secondary container or chamber has no heater but carries aerated water before the water moves out of the secondary container or chamber and into and downwardly along a passage which lead eventually to the reservoir. Thus, the configurations of the primary and secondary chambers leads to an increase in the yield of the distilled water in the reservoir yet the system remains relatively simple in that only a single heater is used and that is in the primary chamber while the secondary chamber has no heater.

8 Claims, 6 Drawing Sheets

FLUID DISTILLATION APPARATUS

This is a continuation-in-part application of file wrapper continuation application Ser. No. 07/615,945, filed Nov. 20, 1990, and now abandoned, which is a divisional application of Ser. No. 07/456,080, filed Dec. 22, 1989, now U.S. Pat. No. 4,976,824, which is a continuation application of Ser. No. 07/207,572, filed Jun. 16, 1988, now abandoned.

BACKGROUND OF THE INVENTION

In U.S. Pat. Nos. 4,976,824 and 5,030,327, several embodiments of a fluid distillation system are disclosed. For the most part, these embodiments provide effective operation and a reasonable yield of distilled water. However, with proper design of such a system, the operation and yield can be enhanced, and the present invention is directed to apparatus and method for providing an increase in the yield of distilled water from such a system while keeping the system relatively simple in construction.

SUMMARY OF THE INVENTION

This invention is directed to several embodiments of a fluid distillation system wherein each embodiment uses a primary container or chamber for water or fluid to be distilled and a secondary water container or chamber. The two chambers are adjacent to each other, and the secondary chamber cooperates with the primary chamber to direct water vapor generated in the system to travel to a reservoir for collection.

The primary chamber has a heater therewithin near the upper surface of the water carried thereby. The heater is provided for generating water vapor from aerated water, whereby the water vapor when heated will pass out of water at the upper surface of the water and into fluid passages for flow to the reservoir. The secondary container or chamber has no heater but carries aerated water before the water moves out of the secondary container or chamber and into and downwardly along a passage which lead eventually to the reservoir. Thus, the configurations of the primary and secondary chambers leads to an increase in the yield of the distilled water in the reservoir yet the system remains relatively simple in that only a single heater is used and that is in the primary chamber while the secondary chamber has no heater.

The primary object of the present invention is to provide an improved apparatus and method for distilling fluid, such as water, wherein the apparatus can take any one of a number of forms yet, in any form, the apparatus has a heater in a primary water container or chamber while a secondary water container or chamber is free of any heater but which contributes to the overall volume of water vapor supplied to a reservoir to thereby increase the yield of distilled water and improve the efficiency of a distilled water system.

Other objects of this invention will become apparent as the following specification progresses, reference being had to the accompanying drawings for an illustration of the invention.

DESCRIPTION OF SPECIFIC EMBODIMENTS

Figure 1:
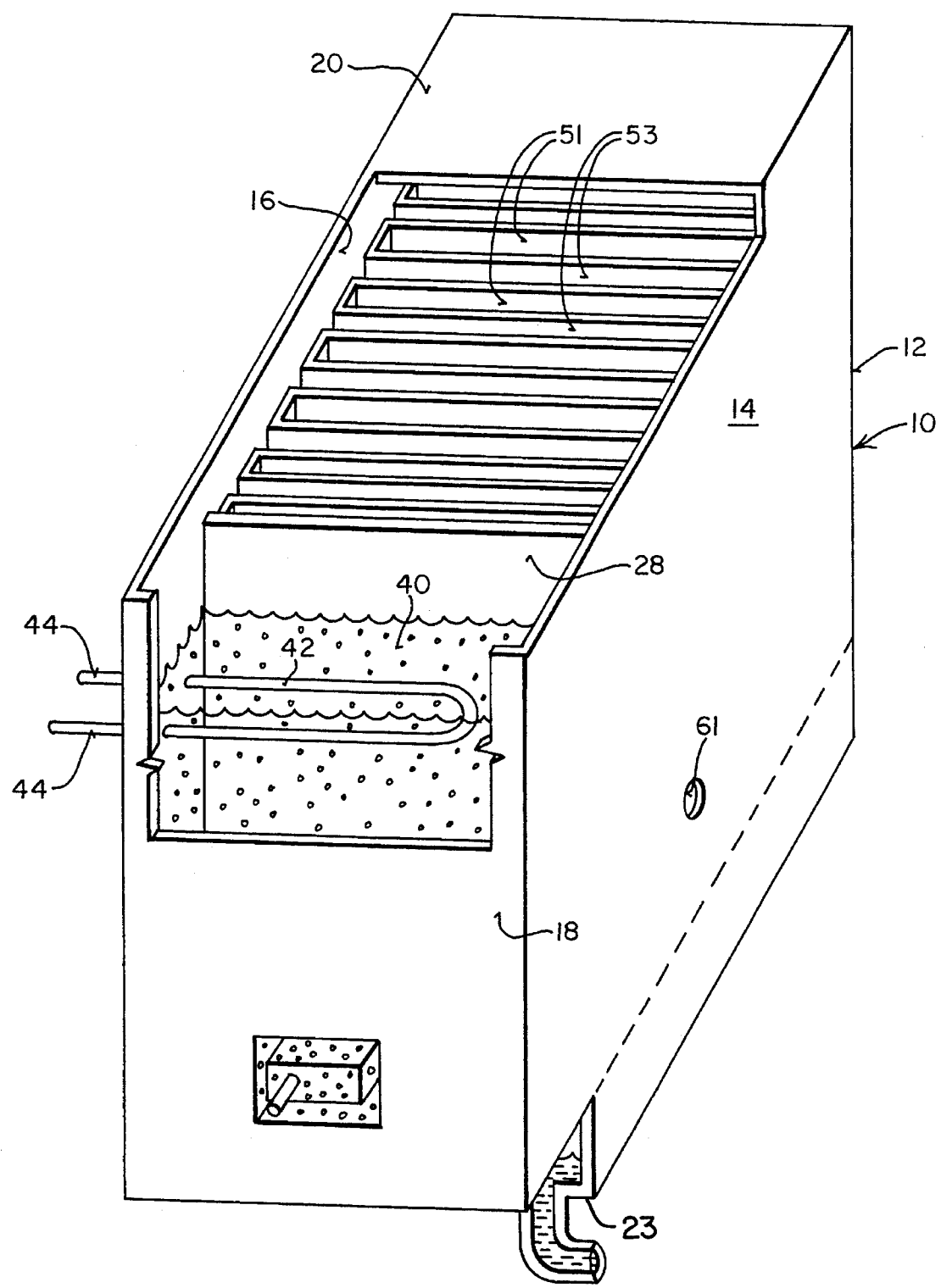
FIG. 1 is a perspective view of a first embodiment of the distillation apparatus of the present invention, parts being broken away and in section to illustrate details of construction.
Figure 2:
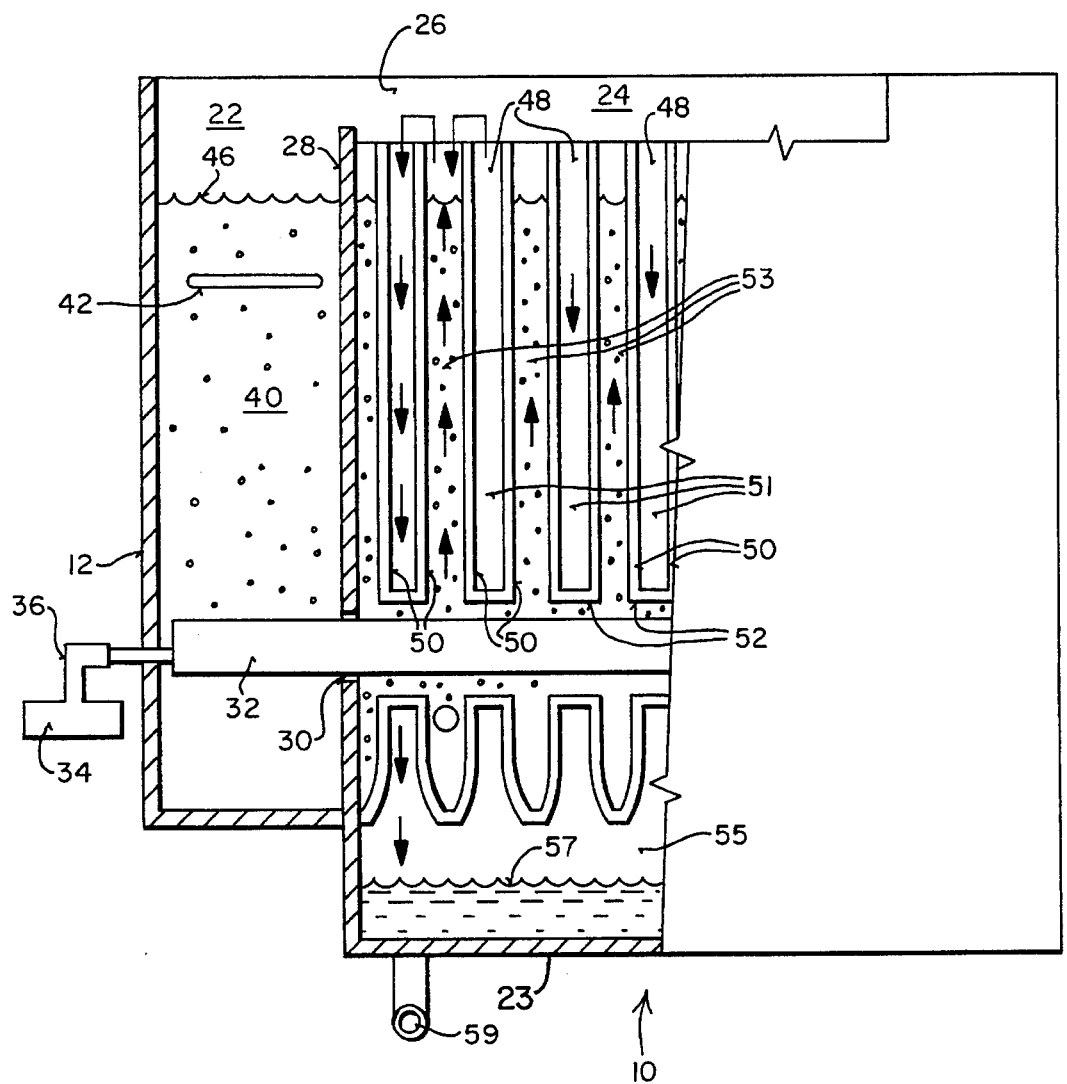
FIG. 2 is a vertical section through a portion of the apparatus of FIG. 1.

A first embodiment of the distillation apparatus of the present invention is broadly denoted by the numeral 10 and is shown in FIGS. 1 and 2. Apparatus 10 includes a housing 12 having a pair of opposed sides 14 and 16 and a pair of opposed ends 18, only one of which is shown in FIGS. 1 and 2. The housing also has a top 20 overlying the housing and a bottom 23.

The housing 12 is divided into two chamber or compartments, namely a primary chamber 22 and a secondary chamber 24, which are in fluid communication with each other at a fluid passage 26 between the upper portions of chambers 22 and 24. A vertical wall 28 is spaced below the inner surface of top 20 to form the passage 26 as shown in FIG. 2, and the wall 28 extends to bottom 23, there being a slot 30 therein for receiving a perforate box 32 which forms an aerator when the box is coupled to a source 34 of air under pressure. A tube 36 couples source 34 with the interior of perforate box 32.

The chambers 22 and 24 are filled with water 40 and the water is aerated by air bubbles which rise from box 32 when air under pressure is blown from source 34, through tube 36 and into and through box 32. The rising air bubbles created when this occurs are shown in FIGS. 1 and 2.

The only structure in chamber 22 is a heater 42 which is in the form of an electrical resistance heater. The ends 44 of the heater project outwardly from side 16 of the housing 12 and the ends 44 are coupled in some suitable manner to a source of electrical power (not shown). Heater 44 is below the upper level 46 of the water in chamber 22, and the heat energy supplied to the heater 42 is sufficient to boil the water above the heater and below the upper level 46 of the water.

Water vapor generated by the boiling of water in chamber 22 travels laterally through passage 26 and into chamber 24, which has no heater, where the water vapor flows downwardly in channels 48 which are parallel and spaced apart. Chambers 48 are formed by parallel panels 50 which have holes 52 therethrough for permitting box 32 to extend laterally from end wall 18 to the opposite end wall (not shown) in FIG. 1. The spaces 53 between adjacent vapor paths 51 serve to channel unheated air bubbles from box 32 upwardly and into the chamber top portion 24 where the air bubbles mix with the heated water vapor from chamber 22 and pass downwardly through channels 51 and into a bottom chamber or reservoir 55 which receives distilled water 57 capable of being drawn off through an outlet 59. Water for make-up purposes is supplied at an inlet 61 when needed or desired. The arrows in FIG. 2 indicate the direction of heated water vapor flow downwardly through channels 51; whereas, the arrows vertically upwardly indicate the direction of travel of unheated air bubbles from box 32.

In operation, apparatus 10 is constructed in the manner shown in FIGS. 1 and 2. Water is then placed in housing 12 to a level 46 above heater 42. Aerator box 32 is supplied with air under pressure from source 34 to cause a generation of air bubbles in the water in chambers 22 and 24. The heater is energized to boil the water above the heater and below surface 46 in passing chamber 22.

By boiling the water in the primary chamber 22, heated water vapor is formed which travels through passage 26 (FIG. 2) and into unheated water vapor chamber 24, whereupon the heated water vapor moves downwardly through channels 51 in countercurrent relationship to upward flow of unheated air bubbles in channels 53. There is a heat exchange between the upward flow of air bubbles in channels 53 and downward flow of heated water vapor in channels 51. This heat exchange thereby heats the upward flow of water and air bubbles and cools the downward flow of heated water vapor, whereby the water vapor condenses and falls into reservoir 55, from where it is drawn off from the housing 12 at outlet 59.

Figure 3:
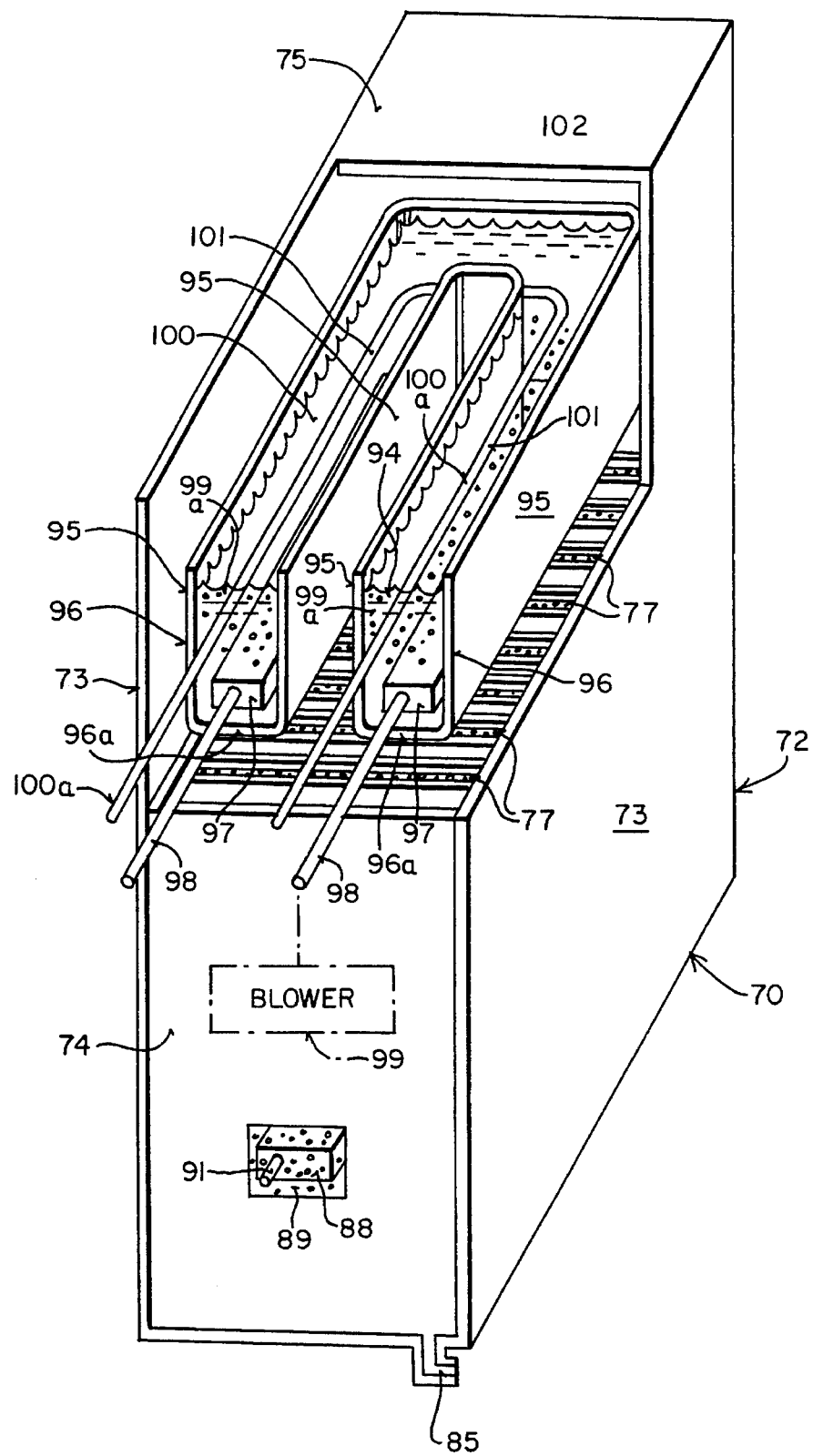
FIG. 3 is a view similar to FIG. 1 but showing a second embodiment of the apparatus of the present invention.
Figure 4:
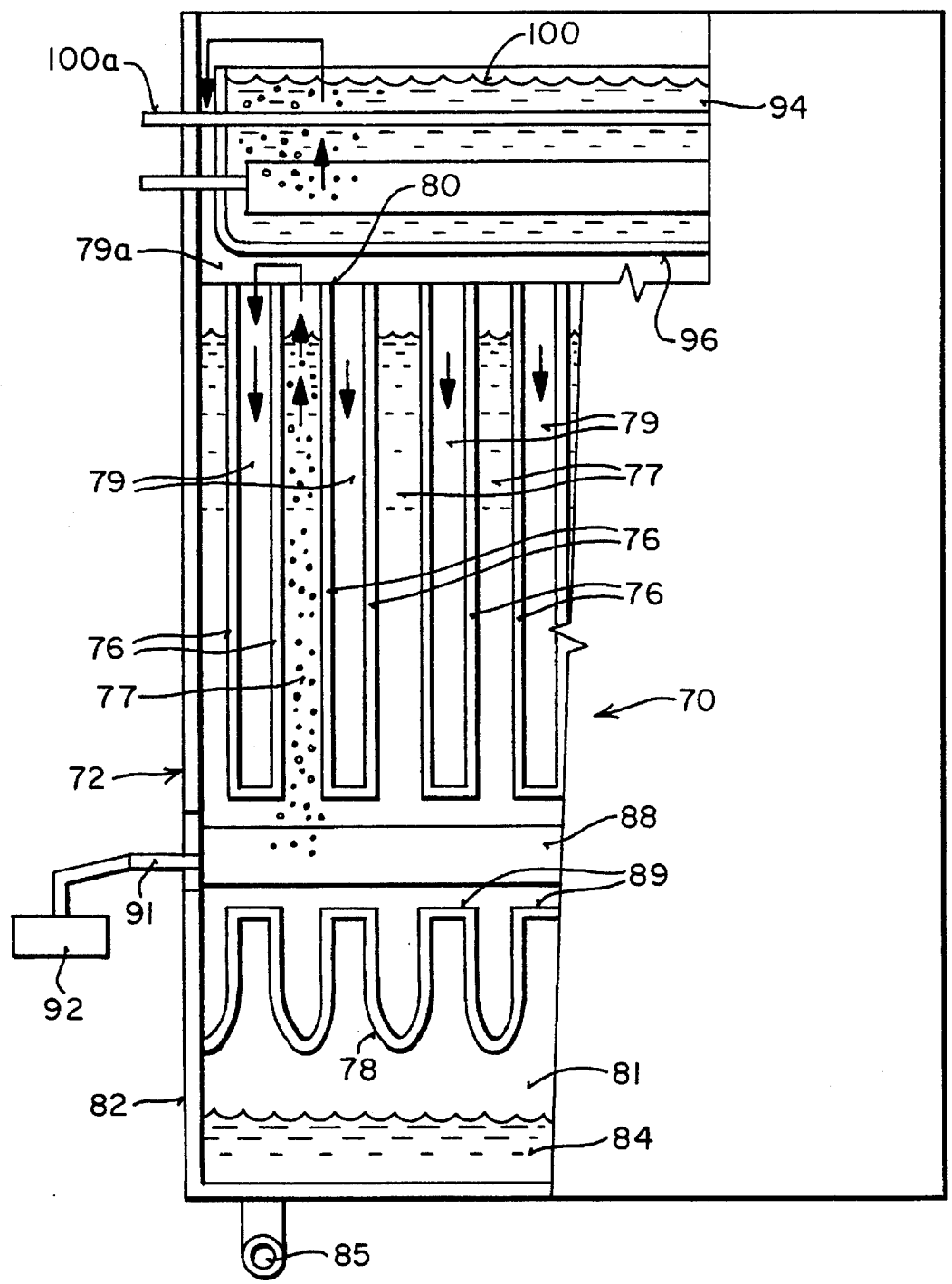
FIG. 4 is a view similar to FIG. 2 but showing a portion of the embodiment of FIG. 3.

FIGS. 3 and 4 show a second embodiment of the apparatus of the present invention. Such embodiment is denoted by the numeral 70 and includes a housing 72 with a pair of opposed sides 73, a pair of opposed ends 74 and a top wall 75. Apparatus 70 includes a series of vertical plates 76 which present vertical water passages 77 with the bottom of the passages 77 being closed off by a bottom wall 78 (FIG. 4).

Plates 76 also form passages 79 for receiving water vapor from a secondary chamber or space 79a above the upper edges 80 of plates 76. There is a space 79a between each pair of adjacent spaces 77, respectively. Spaces 79a are in direct fluid communication with the reservoir 81 at the lower extremity 82 of housing 72. The bottom of reservoir 81 is adapted to collect water vapor in the form of condensed water 84 in the bottom of housing 72. The condensed water can be drawn off through an outlet 85 to another location where the water can be used or stored until ready for use.

Water vapor passages 79 alternate with water passages 77 so that water vapor in space or secondary passage 79a will fall into the open upper ends of passages 79 and be caused to gravitate downwardly past bottom 78 (FIG. 4) and into reservoir 81 where it is condensed, and the condensed water falls into the bottom of the reservoir and becomes fresh potable water 84.

An elongated aerator 88 is placed in the space defined by a plurality of holes 89 through end walls 74 and vertical walls 76 as shown in FIGS. 3 and 4. Aerator 88 comprises a box 90 having holes therethrough for allowing the escape of air from the perforated housing 88 having a tube 91 which leads off to a blower 92 exteriorly of housing 72 (FIG. 3). Actuation of blower 92 causes air to be forced into housing 88 through tube 91, and the air is forced through holes in box 90 and upwardly through passages 77 which are shown as air bubbles in FIG. 4. As the air bubbles rise in passages 77, the air bubbles are heated by virtue of a heat exchange relationship with heated water vapor flowing into and downwardly of passages 79. The heated water vapor is from the primary chamber or space 94 above the bottom of a pair of transversely U-shaped channel members 96 spaced above the upper edges 80 of passages 77 and 78 as shown in FIGS. 3 and 4. As the downflow of heated water vapor occurs, such water vapor transfers at least some of its heat energy to the upcoming water vapor in spaces 77 and this preheats the upcoming water vapor in passages 77 while cooling the downflowing unheated water vapor in passages 79.

Channel members 96 each includes a pair of sides 95 which are generally parallel and a bottom 96a interconnecting sides 95 and containing an aerator 97 which is fed through a tube or pipe 98 from a blower or the like 99. The blower 99 is outside the housing 72, and the air forced into aerators 97 bubbles into a volume 99 of water, the water being filling both channel members 96 up to the level 100 as shown in FIG. 4.

The aerated water in channel members 95 is heated by respective sides of a U-shaped heater 100A having side segments 101 and an end segment 102, segments 101 and 102 being below water level 100 as shown in FIG. 4. Thus, the water is adequately heated in channel members 96 and boiled at a location spaced below water level 100 yet no substantial boiling of the water takes place in secondary chamber or space 79 (FIG. 4), exteriorly of the interior spaces of channel members 95.

Water heated by heater 100A is caused to rise and form water vapor in the space above the heaters and above the water level 100 of the channel members 96. The water vapor passes through space 79a and enters the upper, open ends of passages 77 where the water vapor is caused to follow the passages 77 down past aerator 90 and into reservoir 81 where the water vapor is condensed as potable, clean, distilled water in water volume 84. The water can be drawn off from reservoir 81 through outlet 85.

Figure 5:
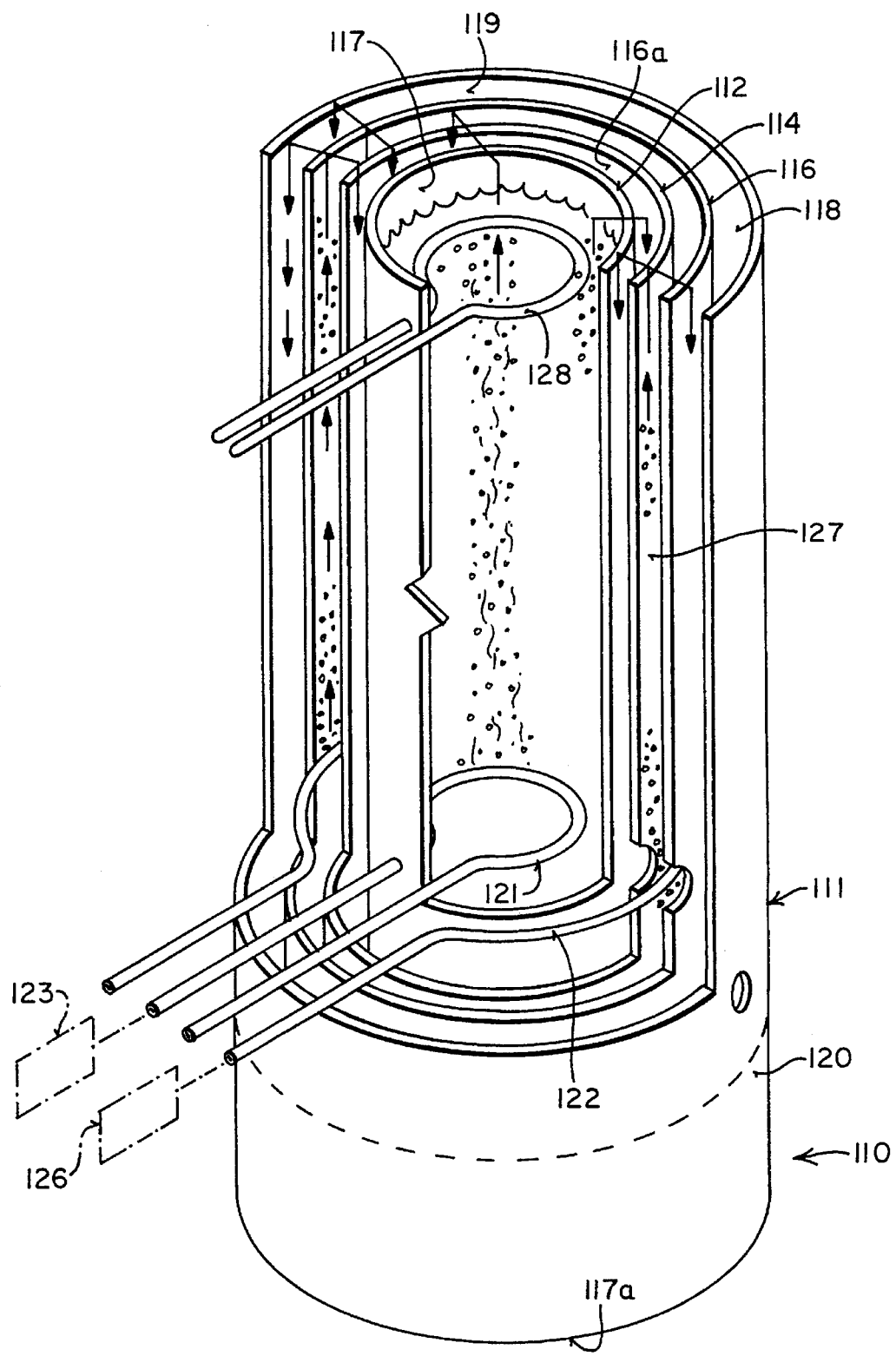
FIG. 5 is a perspective view of a third embodiment of the apparatus of the present invention, parts being broken away and in section to illustrate details of construction.

A third embodiment of the present invention is broadly denoted by numeral 110 and is shown in FIG. 5. Apparatus 110 includes a housing 111 which is generally cylindrical in configuration. Apparatus 110 further includes cylindrical walls 112, 114 and 116 which are concentric to housing 111, the latter having a bottom 117a resting on a surface therebelow.

Walls 111 and 112 define a first fluid passage 118 for placing a primary chamber or space 117 at the top of apparatus 10 in fluid communication with a reservoir 120 at the bottom of apparatus 110. Water vapor travels downwardly through passage 118 and enters the open end of reservoir 120.

A pair of semi-circular aerator tubes 121 and 122 are mounted in the lower end of apparatus 110 above reservoir 120. A blower 123 supplies aerator 121 with air under pressure, and the air rises as air bubbles 124 as shown in FIG. 5. Aerator 122 is coupled by a blower 126 so that the aerator 121 and aerator 122 will cause a stream of rising air bubbles as shown in the fluid passages defined by and within inner wall 116 and by and between wall 116 intermediate wall 112. The rising air bubble stream breaks the water surface and causes flow of the air because of the pressure thereon from space 118 downwardly into the space 116a and 118, whereupon the air bubbles gain heat and are carried downwardly along with water vapor generated by the electrical resistance heater 128 in the interior of wall 112. The water vapor caused by boiling of the water in isolated center space 117 passes downwardly through the open annular upper end of space or passage 116a and space or passage 118, whereby the heated water vapor is in heat exchange relationship to the upcoming aerated water in passage 127. Thus, the downward flow of water vapor is cooled and thereby condensed for gravitational movement into reservoir 120. The region between walls 114 and 116 at the upper ends thereof define a secondary chamber with no heater therein.

Figure 6:
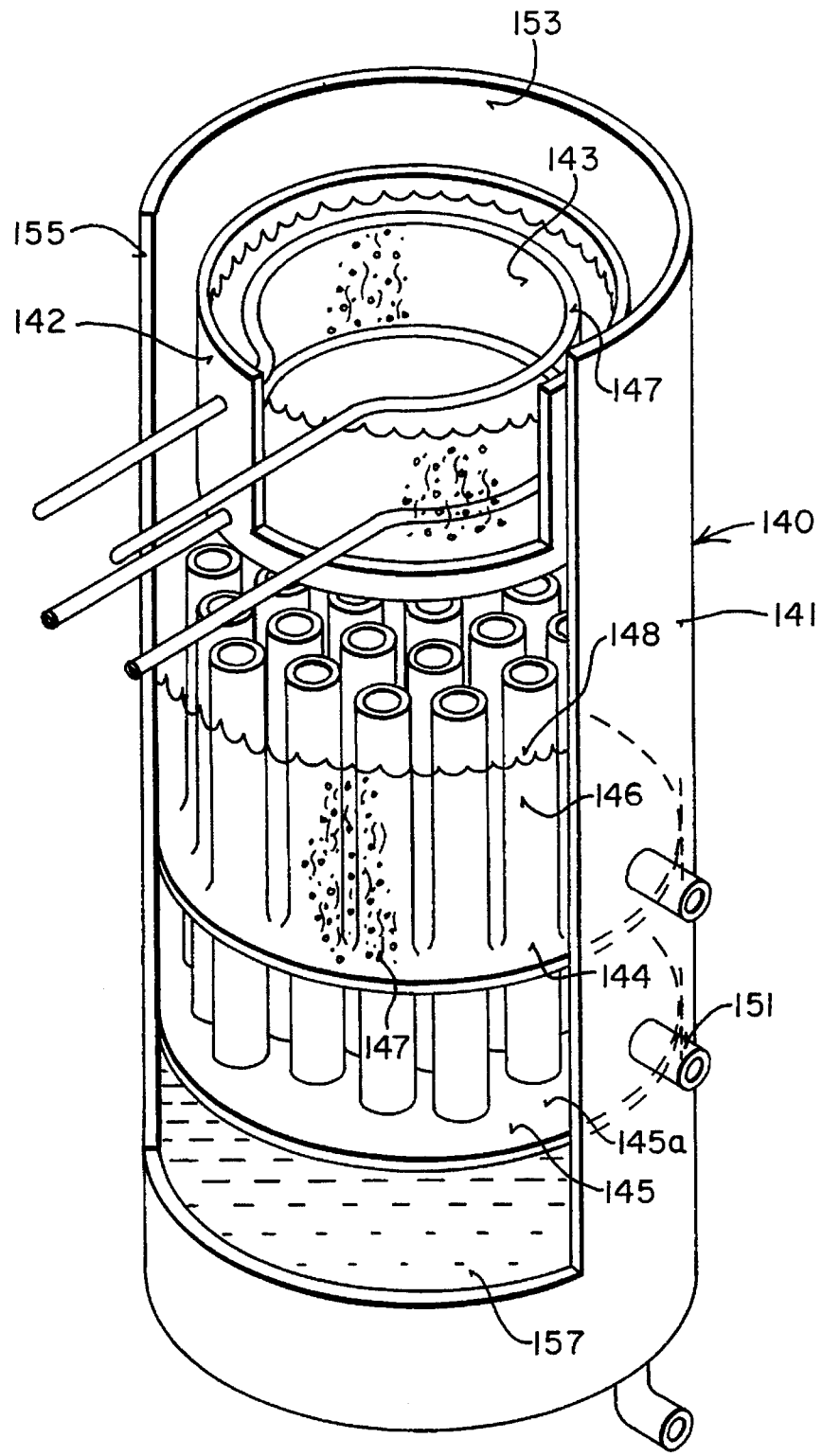
FIG. 6 is a view similar to FIG. 5 but showing a fourth embodiment of the apparatus of the present invention.

A fourth embodiment of the present invention is broadly denoted by the numeral 140 and is shown in FIG. 6. Apparatus 140 includes an outer cylindrical wall 141, and an inner cylindrical pan-like container 142 concentric to wall 141. A plurality of vertically spaced tubes 143 are mounted on an annular disk 144 whose outer periphery is secured to the inner surface of wall 141. Tubes 143 could have a spiral configuration, if desired. Thus, when disk 144 is secured to wall 141, tubes 143 are mounted vertically with the lower ends of the tubes 143 extending through holes (not shown) in a bottom disk member 145 which is parallel with disk 144 and is also connected to the inner surface of wall 141.

The space 145a between disk 144 and 145 has a tube 151 which comprises a source of air bubbles and thereby defines an aerator for supplying air to the bottoms of tubes 143. Tube 151 coupled to the side of wall 141 communicates with space 145a to supply air from a blower to the interior space 145a.

Disk 144 is provided with a plurality of holes 147 therethrough so that air under pressure in space 145a will pass through the holes 147 and into and through the spaces between tubes 143.

The air bubbles pass upwardly to the upper surface 148 of water on the space above disk 144. In so doing, the aerated water moves in heat exchange relationship to water vapor flowing out of the open top of container 142 and into a primary chamber 146 which is aligned with and above a heater 147. Such water vapor passes through space 153, then down through the space 155 between container 142 and wall 141, then into the secondary chamber near and above the open tops of tubes 143, then downwardly to a reservoir 157, heater 150 being below water level 149 in container 142 and which is coupled to a source of electrical power (not shown).

In use, air is directed into space 145a through tube 151 and the air is caused to penetrate through openings 147 and into and through the space upwardly which surrounds tubes 143. The water is boiled in container 142 to form a water vapor component and this water vapor moves upwardly and out of the water and into the space 153 above the heater 150. The water vapor flows downwardly through the tubes 143 and into reservoir 155 where it is drawn off such as in the manner shown in FIGS. 3–6.

What is claimed is:

1. Apparatus for distilling a fluid comprising:
   a housing having an outer wall defining a hollow space therewithin;
   means near the bottom of the housing for forming a reservoir for receiving condensed fluid vapor;
   a first chamber in the housing for receiving fluid to be heated;
   heater means in the first chamber near the upper level of the fluid thereof for heating the fluid to a boiling temperature whereby the fluid will form a vapor which will move out of the chamber to a space adjacent to the fluid level;
   means for channeling the vapor from the first chamber to the reservoir;
   means for defining a second chamber adjacent to the first chamber and free of a heater, said second chamber adapted to contain fluid to a level below the fluid level of the first chamber; and
   aerator means in the housing for aerating the fluid in said chambers.

2. Apparatus as set forth in claim 1, wherein said fluid is water, said chambers are horizontally aligned with each other, there being a single aerator extending through the bottom portions of the housing for simultaneously aerating the water in the chambers.

3. Apparatus as set forth in claim 1, wherein said first chamber includes a pair of chamber parts, each chamber part having an aerator therein near the bottom thereof and a heater common to both chamber parts, each chamber part being above the second chamber.

4. Apparatus as set forth in claim 3, wherein each chamber part is transversely U-shaped and has a portion of the heater extending therethrough, there being an aerator box in a lower part of the chamber part.

5. Apparatus as set forth in claim 4, wherein an aerator for the second chamber is in the housing near the lower part thereof.

6. Apparatus as set forth in claim 1, wherein the first chamber includes a cylindrical wall generally concentric with the housing wall, the second chamber being defined by a pair of cylindrical walls concentric with the first wall and laterally spaced outwardly therefrom, the first and second chambers having means for receiving a pipe for replenishing the fluid in the first and second chambers, said aerator means including an aerator for each of said chambers, respectively.

7. Apparatus as set forth in claim 6, wherein the aerator for the first chamber is near the bottom of the first chamber and is curved, the second aerator having a curved configuration and being received in the bottom of the second chamber, the second chamber having a separate end in fluid communication with the first chamber and with the passage means for carrying fluid vapor downwardly from the upper space above the fluid level in the first chamber, the water vapor being transported to the reservoir in the housing apparatus.

8. Apparatus as set forth in claim 1, wherein the first chamber includes a cylindrical pan-like member having an open top and an outer sidewall spaced inwardly from the sidewall of the housing, an aerator in the member near the bottom thereof, the heater being in the member above the aerator and near the normal level of water in the member, water vapor generated in the member being movable above the member and then down past the sides thereof, said second chamber including a space above a plurality of vertical, open end tubes spaced below the member, and means mounting the tubes in a vertical position in the housing below the member, each tube communicating with a third chamber which receives aerated water from an aerator to aerate the water in the second chamber, and means for aerating the second chamber separately from the aeration of the first chamber.

* * * * *